United States Patent [19]

Stadelmann

[11] Patent Number: 5,295,564
[45] Date of Patent: Mar. 22, 1994

[54] FRICTIONAL DAMPER

[75] Inventor: Ludwig Stadelmann, Altdorf, Fed. Rep. of Germany

[73] Assignee: Suspa Compart AG, Altdorf, Fed. Rep. of Germany

[21] Appl. No.: 762,976

[22] Filed: Sep. 20, 1991

[30] Foreign Application Priority Data

Sep. 29, 1990 [DE] Fed. Rep. of Germany ....... 4030869

[51] Int. Cl.⁵ .............................................. F16F 11/00
[52] U.S. Cl. .................................... 188/381; 188/129
[58] Field of Search ............... 188/129, 381, 271, 297, 188/311, 322.22, 264 B; 262/200, 196, 207, 134; 92/157, 160

[56] References Cited

U.S. PATENT DOCUMENTS

| | | | |
|---|---|---|---|
| 2,212,759 | 8/1940 | Tea | 267/200 |
| 2,244,166 | 6/1941 | Marien | 92/160 |
| 2,748,718 | 6/1956 | MacClatchie | 92/160 X |
| 3,216,334 | 11/1965 | Bauer | 92/160 X |
| 4,552,344 | 11/1985 | Johnson | 92/160 X |
| 4,729,458 | 3/1988 | Bauer et al. | 188/129 |
| 4,946,008 | 8/1990 | Bauer et al. | 188/129 |
| 5,085,297 | 2/1992 | Bauer et al. | 188/129 |

FOREIGN PATENT DOCUMENTS

3020026 12/1981 Fed. Rep. of Germany.

*Primary Examiner*—Robert J. Oberleitner
*Attorney, Agent, or Firm*—Browdy and Neimark

[57] ABSTRACT

A frictional damper, in particular for washing machines with spinning action, comprises a circular cylindrical housing and a tappet which is coaxially displaceable inside the housing and extends out of it with one end, the other end being provided with a friction piston. The friction piston has at least one friction coating made of an elastically resilient material and is provided with a grease storage chamber. In order to prevent a decrease of damping because of change from lubricated to dry friction and in order not to disturb the friction proportions between friction coating and inner wall of the housing, the grease storage chamber is provided within the friction piston and is connected by way of at least one grease channel with a grease chamber which is formed at the outer circumference of the friction piston and which is open towards the inner wall of the housing.

9 Claims, 2 Drawing Sheets

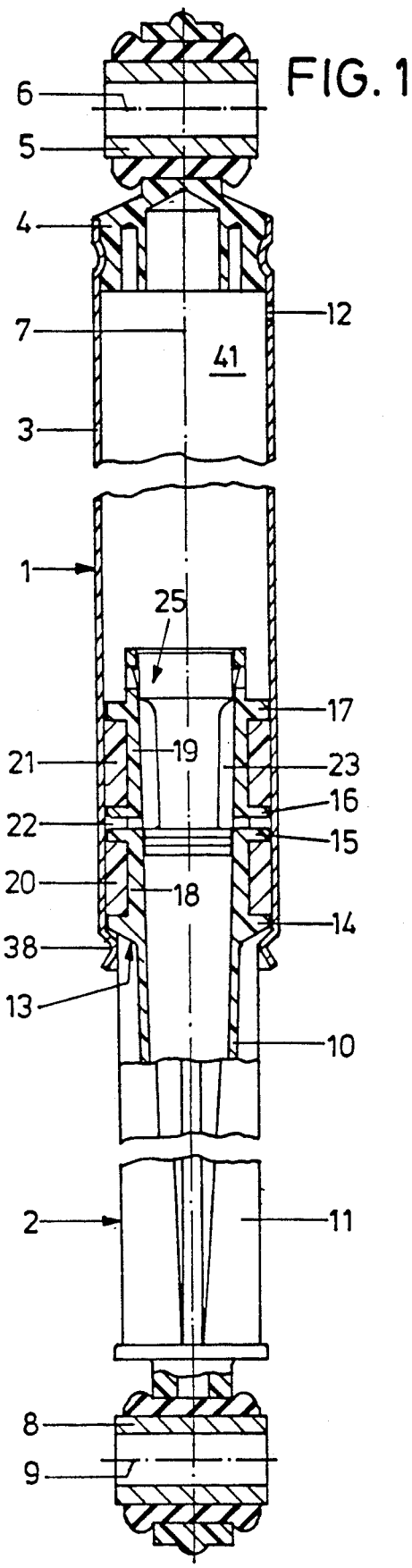
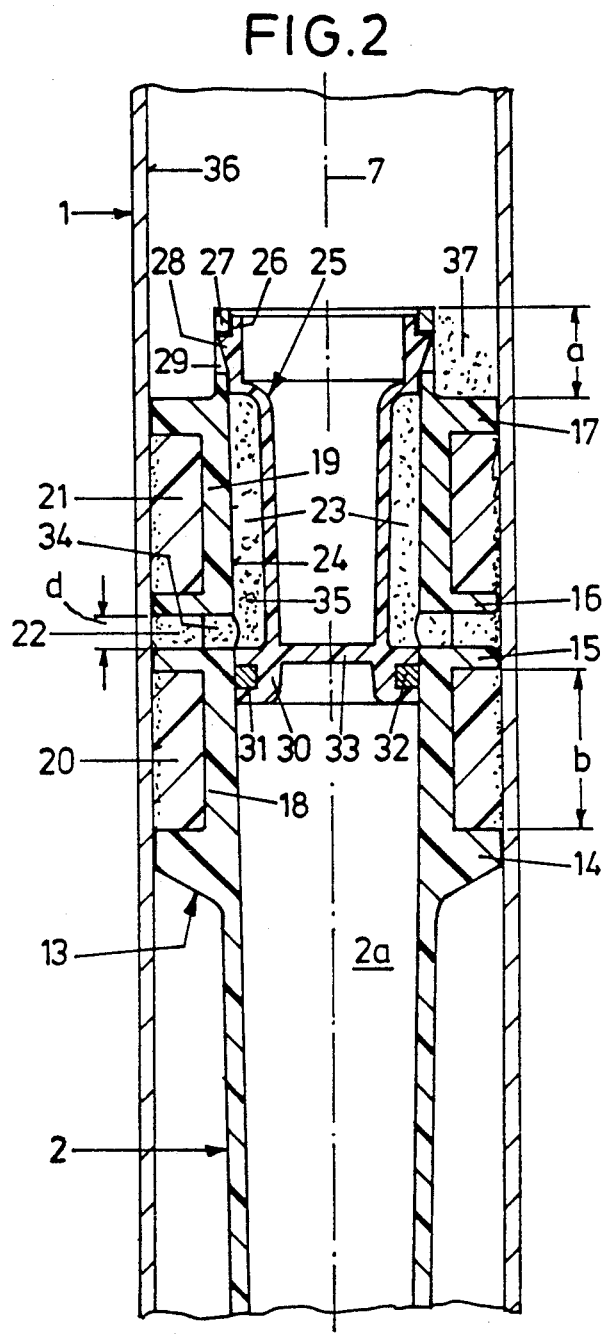

FRICTIONAL DAMPER

FIELD OF THE INVENTION

The invention relates to a frictional damper, in particular for washing machines with spinning action, comprising a substantially circular cylindrical housing and a tappet which is coaxially displaceable inside it and extends out of it with one end, the other end being provided with an approximately cylindrical friction piston, the friction piston having at least one approximately circular cylindrical support segment and bracing flanges radially extending beyond the latter and axially limiting the latter at fixed distances, a friction coating made of an elastically resilient material being disposed on the support segment and between the bracing flanges and being elastically pressed against the inner wall of the housing, and a grease storage chamber being formed on the friction piston.

BACKGROUND OF THE INVENTION

Frictional dampers of this type are known from U.S. Pat. No. 4,729,458. These lubricated frictional dampers have had extraordinary success in practical use; they are used in particular large numbers in washing machines. Customarily the friction coatings comprise cellular, foamed plastic, the cells of the plastic being impregnated with grease. It has been shown that with extreme loads over long periods of time the friction changes from lubricated to dry friction, i.e. the frictional damper heats up to high degree. In order to minimize this disadvantage, grease chambers have been provided on the outside of the friction piston in the form of an annular groove containing a little supply of additional grease. But this measure did not basically eliminate the problem, either.

In the U.S. Pat. No. 5,085,297 it has been suggested to eliminate these problems to form the grease storage chamber within the friction piston and to connect by way of at least one grease channel with the at least one friction coating. To this effect a permanent re-impregnation of the friction coatings is to be realized. The grease is to travel in small quantities through the grease channel or channels to the friction coatings and through the latter to the friction surface between friction coating and inner wall of the housing. It has been proved disadvantageous that in the vicinity of the grease channels the friction coating is not supported, so that different pressures between the friction coating and the inner wall of the housing are produced.

SUMMARY OF THE INVENTION

It is therefore an object of the invention to improve on the one hand a frictional damper of the type according to the species in such a way that a decrease of damping because of a change from lubricated to dry friction is prevented and on the other hand not to disturb the friction proportions themselves between friction coating and inner wall of the housing.

This object is achieved by the invention in that the grease storage chamber is formed within the friction piston and is connected by way of at least one grease channel with a grease chamber which is formed at the outside of the friction piston and which is open towards the inner wall of the housing. By means of that it is achieved that the grease gets directly onto the inner wall of the housing and from there also onto the friction surfaces of the friction coatings. The support surface of the friction coatings is not affected. Furthermore the grease discharge to the inner wall of the housing is not dependent from the permeability of the friction coatings.

It is a particular advantageous, when the grease chamber—in a known manner—is formed between two bracing flanges.

When in an advantageous embodiment of the invention the grease storage chamber is formed by an insert body located in the friction piston, then the grease storage chamber itself is easy to manufacture on the one hand and it is in particular easy to install with a grease filling in the friction piston. The latter is possible in a particularly simple manner, when the insert body is elastically interlocking with the tappet by means of barbed-hook-type interlocking projections engaging with recesses of the tappet.

In order to prevent grease from getting from the storage chamber into the tappet and from there to the outside, it is advantageous for the insert body to be sealed towards an inner wall of the friction piston in the vicinity of an end facing the interior space of the tappet.

A particularly advantageous embodiment can be seen in that the insert body is formed as largely closed vessel merely opened towards the at least one grease channel with one outlet opening. In this case it can be virtually inserted into the tappet as largely closed grease cartridge. In order to ensure in this case the conveyance of the grease into the grease chamber, it is advantageous to provide in the insert body a conveyor unit pressing the grease towards the grease channel. In a particularly advantageous embodiment the latter can have a piston guided displaceable in the insert body and limiting at one side the grease storage chamber. The latter can be formed as mass piston exerting corresponding pulsating forces respectively onto the grease when oscillating. Alternatively or cumulatively the piston can be loaded with a compression spring constantly exerting a force onto the grease.

Further details, advantages and features of the invention will become apparent from the ensuing description of two exemplary embodiments taken in conjunction with the drawing.

BRIEF DESCRIPTION OF THE DRAWING

FIG. 1 is a longitudinal section of a frictional damper,

FIG. 2 is a partial longitudinal section of a frictional damper on a larger scale as compared with FIG. 1

DESCRIPTION OF THE PREFERRED EMBODIMENTS

Figure 3:
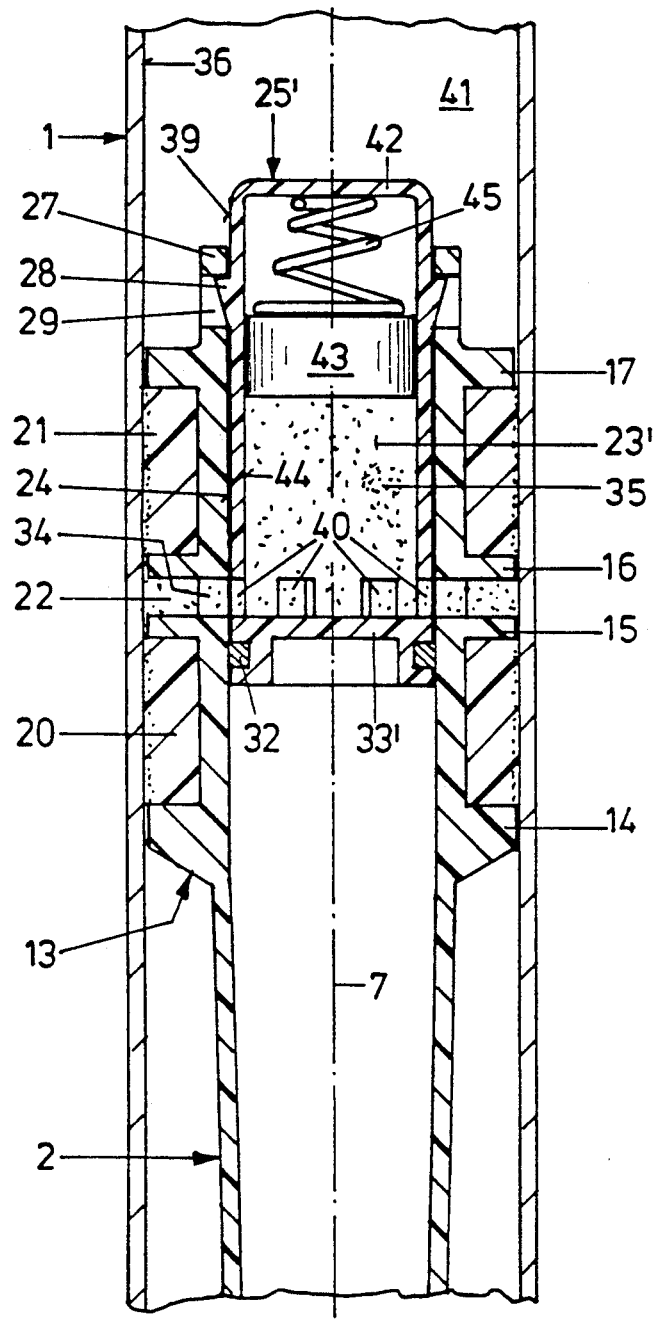
FIG. 3 is a partial longitudinal section through a frictional damper in a modified version as compared with FIG. 1 and 2.

The frictional damper illustrated in the drawing comprises a housing 1 and a tappet 2. The housing 1 essentially consists of a cylindrical metallic pipe 3, closed on one end by means of a bottom 4. A guide sleeve 5 for connecting the frictional damper is disposed on the exterior of the bottom 4. This guide sleeve 5 has an axis of symmetry 6 used as pivoting axis, which vertically intersects the center longitudinal axis 7 of the frictional damper.

The tappet 2 also is provided with a guide sleeve 8 at its extreme end, the axis 9 of which also vertically intersects the center longitudinal axis 7. The tappet 2 itself is essentially comprised of a pipe 10, which tapers outwards the guide sleeve 8 and which is reinforced on its outside by means of longitudinal ribs 11. The pipe 3 is provided with an exhaust opening 12. The tappet 2 is injection molded of plastic in one piece.

A friction piston 13 is formed on the inner end of the tappet 2 located inside the housing 1, which has annular bracing flanges 14, 15 and 16, 17 formed at a distance from each other, and which are associated in pairs. Between the bracing flanges 14, 15 or 16, 17 respectively associated to each other, approximately circular cylindrical support segments 18, 19 are provided and are also disposed concentrically to the axis 7. On each of the support segments 18, 19 a friction coating 20, 21 is disposed. These friction coatings 20, 21 consist of cellular elastic foam material, for example polyurethane foam.

Between the adjoining bracing flanges 15, 16 and thus also between the friction coatings 20, 21, a grease chamber 22 in the shape of an annular groove is disposed, which has a relatively little volume in comparison to the volume of the friction coatings 20 or 21.

A grease storage chamber 23 comparatively large in volume is arranged on the inner side of the friction piston 13 and is limited outside by the inner wall 24 of the friction piston 13 and inside and at its axial ends by an insert body 25. This insert body 25 rests with an annular collar 26 against the inner wall 24 of an extension tube 27 of the tappet 2 connecting to the bracing flange 17. It is fixed axially and tangentially related to the friction piston 13 by means of barbed-hook-type interlocking projections 28 projecting radially outwards and engaging with corresponding recesses 29 in the extension tube 27.

On its other end facing the guide sleeve 8 the insert body 25 has a cylindrical section 30 in which an annular groove 31 is provided. An O-ring packing 32 is located in the latter and rests against the inner wall 24 of the friction piston 13, and that in the vicinity of the bracing flange 15, which limits the grease chamber 22 on the side facing the guide sleeve 8. The storage chamber 23 thus extends over approximately the axial length of the support segment 19 including the pertaining bracing flanges 16, 17 and the grease chamber 22.

In the vicinity of the cylinder section 30 the insert body 25 is closed by a front wall 33, closing the interior space 2a of the tappet 2. The whole insert body 25 is made in one piece from an appropriate elastic plastic material, so that it can be interlocked elastically with the tappet 2.

In the friction piston 13 grease channels 34 are provided leading from the storage chamber 23 to the grease chamber 22, so that from the grease storage chamber 23 grease 35 can be post-conveyed to the outer grease chamber 22, and that in the same measure as the grease 35 rests or is used from this chamber 22 when operating the frictional damper on the inner wall 36 of the housing 1. The width d of the grease channels 34 is approximately 1.0 to 1.5 mm, the width d and the number of the channels 34 being essentially dependent from the viscosity of the grease 35 located in the storage chamber 23.

The grease 35 is discharged from the chamber 22 to the inner wall 36 and from there it is absorbed by the friction coatings 20, 21. The latter consists of foamed material, the cells of which are at least opened in the friction surface resting against the inner wall 36. Polyurethane foamed material is in particular appropriate for this.

The extension tube 27 extends axially by a dimension a over the side of the end of the bracing flange 17 of the friction piston 13, which is a little smaller than the axial length b of the friction coatings 20 and 21 respectively. This extension tube 27, in concert with the associated bracing flange 17 and the inner wall 36 of the pipe 3 forms a grease collection chamber 37.

At its open end the pipe 3 is provided with a crimp 38 directed inwards, which is arranged after the tappet 2 has been slid into the housing 1, in order to prevent the tappet 2 from being inadvertently drawn out of the housing 1.

As far as similar parts are used in the exemplary embodiment according to FIG. 3, as in the exemplary embodiment according to FIG. 1 and 2, identical reference numerals have been used. As far as the parts are similar in their function but differ insignificantly in their construction, the same reference numerals provided with a prime line have been used. In such cases a renewed description is not necessary.

In the embodiment according to FIG. 3, an insert body 25' is provided in the friction piston 13 of the tappet 2, which has the form of a cylindrical closed vessel. Its cylindrical outer wall 39 rests against the inner wall 24. The outer wall 39 bears the interlocking projections 28, engaging with the fitted recesses 29 in the extension tube 27. Corresponding outlet openings 40 are assigned to the grease channels 34 in the cylindrical outer wall 39 of the insert body 25'. The insert body 25' is closed with a front wall 42 on its side facing the interior space 41 of the housing, i.e. the side opposite to the front wall 33', adjoining a mass piston 43, which is displaceable guided at the cylindrical inner side of the outer wall 39 of the insert body 25'. Between this mass piston 43 and the front wall 42 a slightly prestressed screw-compression spring 45 is provided and presses the piston 43 against the grease 35, which is located in the grease storage chamber 23', the latter being formed between the piston 43, the front wall 33' and the inner side 44 of the cylindrical outer wall 39 of the insert body 25'. In the same measure as grease 35 is removed from the grease chamber 22 by way of the inner wall 36 of the housing 1, grease 35 is post-conveyed from the storage chamber 23'.

When the frictional damper is used in that manner that the tappet 2 is the agitated part, which is for example fixed at the swinging washing aggregate of a washing machine, the mass piston 43 is accelerated at each change stroke one time in the direction of the grease storage chamber 23' and thus exerts a corresponding force onto the grease 35, which causes the described post-conveyance to the grease chamber 22. When the mass piston 43 has an appropriate mass, the compression spring 45 may be superfluous. If, however, the accelerations are not sufficient or the tappet is mounted immovable in the direction of the center longitudinal axis 7, i.e. the housing 1 performs the corresponding movements, the compression spring 45 is necessary. In this case the mass of the piston 43 can be as small as possible.

What is claimed is:

1. A frictional damper comprising a substantially circular cylindrical housing (1) and a tappet (2) which is coaxially displaceable inside the housing (1) and extends out of it with one end, another end being provided with an approximately cylindrical friction piston (13), the friction piston (13) having at least one approximately circular cylindrical support segment (18, 19) and bracing flanges (14 to 17) radially extending beyond the support segment (18, 19) and axially limiting the support segment (18, 19) at fixed distances, a friction coating (20, 21) made of an elastically resilient material being disposed on the support segment (18, 19) and between the bracing flanges (14 to 17) and being elastically pressed against an inner wall (36) of the housing (1), and a grease storage chamber (23, 23') being formed on the friction piston (13), wherein the grease storage chamber (23, 23') is formed internally of the friction piston (13) and is connected by way of at least one grease channel (34) axially spaced apart from the friction coating (20, 21) and the support segment (18, 19) with a grease chamber (22) formed at the outer circumference of the friction piston (13) at a location spaced apart from the friction coating (20, 21) by at least one of the bracing flanges (14 to 17) and open towards the inner wall (36) of the housing (1).

2. A frictional damper in accordance with claim 1, wherein the grease chamber (22) is formed between two bracing flanges (15, 16).

3. A frictional damper comprising a substantially circular cylindrical housing (1) and a tappet (2) which is coaxially displaceable inside the housing (1) and extends out of it with one end, another end being provided with an approximately cylindrical friction piston (13), the friction piston (13) having at least one approximately circular cylindrical support segment (18, 19) and bracing flanges (14 to 17) radially extending beyond the support segment (18, 19) at fixed distances, a friction coating (20, 21) made of an elastically resilient material being disposed on the support segment (18, 19) and between the bracing flanges (14 to 17) and being elastically pressed against an inner wall (36) of the housing (1), and a grease storage chamber (23, 23') being formed on the friction piston (13), wherein the grease storage chamber (23, 23') is formed internally of the friction piston (13) and is connected by way of at least one grease channel (34) axially spaced apart from the friction coating (20, 21) and the support segment (18, 19) with a grease chamber (22) formed at the outer circumference of the friction piston (13) at a location spaced apart from the friction coating (20, 21) by at least one of the bracing flanges (14 to 17) and open towards the inner wall (36) of the housing (1),
wherein the grease storage chamber (23, 23') is limited by an insert body (25, 25') located in the friction piston (13), and
wherein the insert body (25) is formed as a largely closed vessel, merely open towards the at least one grease channel (34) with an outlet opening (40).

4. A frictional damper in accordance with claim 3 wherein the insert body (25, 25') is elastically interlocking with the tappet (2) by means of a barbed-hook-type interlocking projection (28) engaging with recesses (29) of the tappet (2).

5. A frictional damper in accordance with claim 3 wherein the insert body (25, 25') is sealed towards an inner wall (24) of the friction piston (13) in the vicinity of an end of the piston (13) facing an interior space (2a) of the tappet (2).

6. A frictional damper comprising a substantially circular cylindrical housing (1) and a tappet (2) which is coaxially displaceable inside the housing (1) and extends out of it with one end, another end being provided with an approximately cylindrical friction piston (13), the friction piston (13) having at least one approximately circular cylindrical support segment (18, 19) and bracing flanges (14 to 17) radially extending beyond the support segment (18, 19) at fixed distances, a friction coating (20, 21) made of an elastically resilient material being disposed on the support segment (18, 19) and between the bracing flanges (14 to 17) and being elastically pressed against an inner wall (36) of the housing (1), and a grease storage chamber (23, 23') being formed on the friction piston (13), wherein the grease storage chamber (23, 23') is formed internally of the friction piston (13) and is connected by way of at least one grease channel (34) axially spaced apart from the friction coating (20, 21) and the support segment (18, 19) with a grease chamber (22) formed at the outer circumference of the friction piston (13) at a location spaced apart from the friction coating (20, 21) by at least one of the bracing flanges (14 to 17) and open towards the inner wall (36) of the housing (1),
wherein the grease storage chamber (23, 23') is limited by an insert body (25, 25') located in the friction piston (13),
wherein the insert body (25') is formed as a largely closed vessel, merely open towards the at least one grease channel (34) with an outlet opening (40), and
wherein a conveyor unit is provided in the insert body (25') pressing the grease (35) towards the at least one grease channel (34).

7. A frictional damper in accordance with claim 6 wherein the conveyor unit is provided with a piston (43) limiting the grease storage chamber (23') at one side and being guided displaceable in the insert body (25').

8. A frictional damper in accordance with claim 7, wherein the piston is formed as mass piston (43).

9. A frictional damper in accordance with claim 7, wherein the piston (43) is loaded with a compression spring (45).

* * * * *